United States Patent
Chung et al.

(10) Patent No.: US 8,040,882 B2
(45) Date of Patent: Oct. 18, 2011

(54) EFFICIENT KEY SEQUENCER

(75) Inventors: Edgar Chung, Mountain View, CA (US); Puneet Agarwal, Cupertino, CA (US); Shailesh Maskai, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 375 days.

(21) Appl. No.: 12/031,076

(22) Filed: Feb. 14, 2008

(65) Prior Publication Data

US 2009/0207833 A1 Aug. 20, 2009

(51) Int. Cl.
*H04L 12/28* (2006.01)
(52) U.S. Cl. .................................. 370/389; 370/474
(58) Field of Classification Search .............. 370/389, 370/474, 473, 401, 392
See application file for complete search history.

(56) References Cited

U.S. PATENT DOCUMENTS

| | | | |
|---|---|---|---|
| 7,233,597 B2 * | 6/2007 | Kumar et al. | 370/401 |
| 2002/0032681 A1 * | 3/2002 | Feldmeier et al. | 707/3 |
| 2004/0015599 A1 * | 1/2004 | Trinh et al. | 709/232 |
| 2004/0252722 A1 * | 12/2004 | Wybenga et al. | 370/474 |
| 2006/0173831 A1 * | 8/2006 | Basso et al. | 707/3 |
| 2007/0171911 A1 * | 7/2007 | Ku | 370/392 |

* cited by examiner

*Primary Examiner* — Robert Wilson
(74) *Attorney, Agent, or Firm* — Brake Hughes Bellerman LLP

(57) ABSTRACT

A method includes for determining a plurality of fields of a packet associated with a routing of the packet, wherein each field of the plurality of fields includes one or more bits. Arranging the bits of the plurality of fields into a plurality of ordered partitions of a search sequence, the search sequence being associated with a plurality of searches, wherein the searches are based on the bits included in one or more of the ordered partitions. Providing, to a routing table including routing information associated with the routing of the packet, one or more of the ordered partitions of the search sequence, wherein the routing table is structured based on the search sequence. Receiving, based on the plurality of searches, the routing information associated with the routing of the packet from the routing table. Routing the packet based on the routing information.

16 Claims, 5 Drawing Sheets

200

300

EFFICIENT KEY SEQUENCER

TECHNICAL FIELD

This description relates to key sequencing.

BACKGROUND

Networking has become an integral part of communications in today's world. In the transfer of data packets between two or more nodes across one more networks, it is likely that the packet may be received and processed by one or more intermediate devices, such as network routers and/or bridges. These intermediate network devices (and/or nodes) may have a limited amount of bandwidth and/or time to devote to the processing of each packet, as they may need to handle large volumes of packets. This being the case, any additional efficiency that may be introduced in the processing of the packets would be desirable. In example embodiments, a network router may receive a packet and determine how to forward or process the packet based on searching routing information in a database based on information included in the packet. The processing and/or transfer of the packet information from the packet to the database may be one area wherein greater efficiency may be introduced.

SUMMARY

A system and/or method for sequencing keys, substantially as shown in and/or described in connection with at least one of the figures, as set forth more completely in the claims.

DETAILED DESCRIPTION

Figure 1:
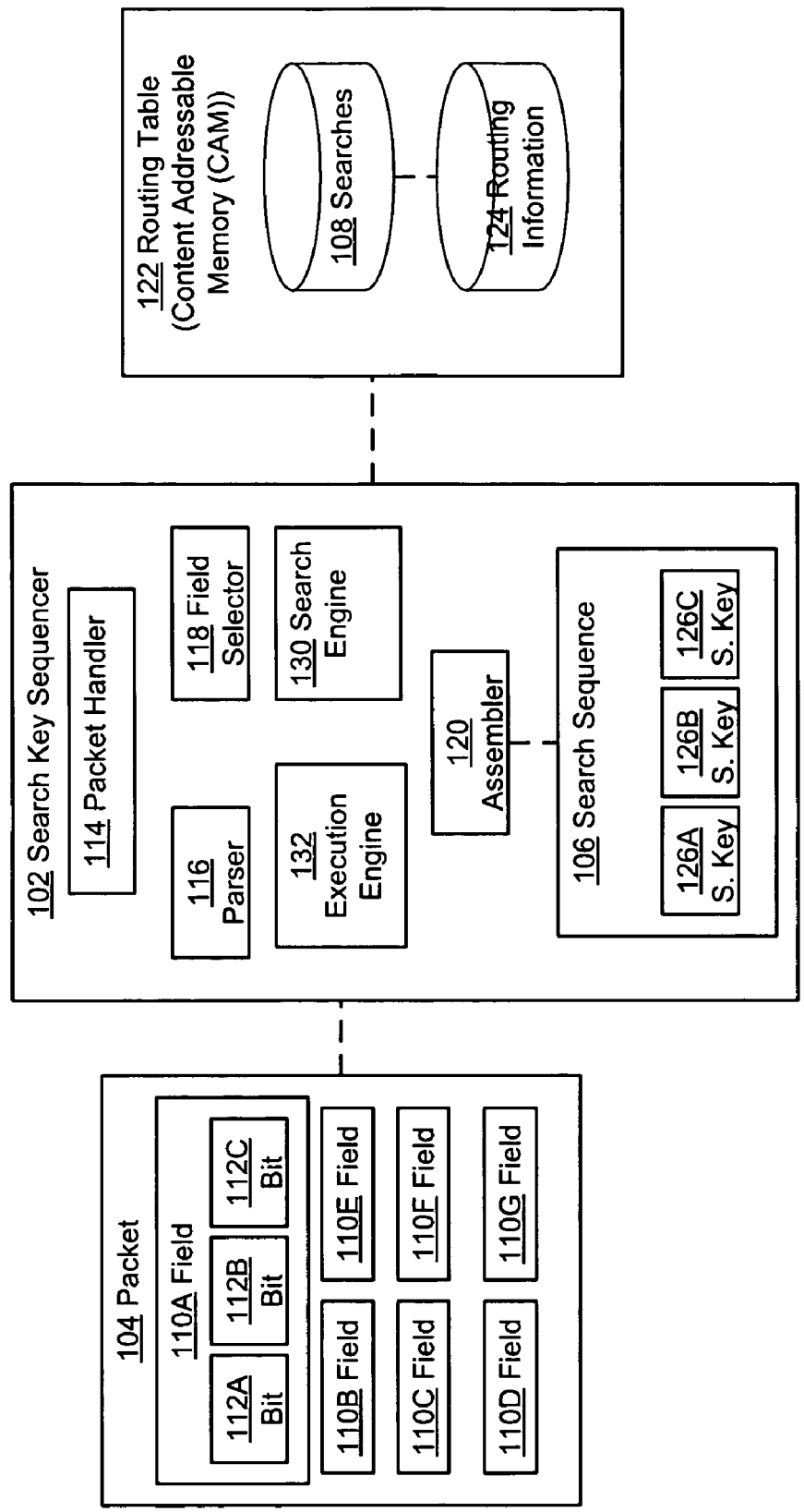
FIG. 1 is a block diagram of an example embodiment of a system for efficient key sequencing.

FIG. 1 is a block diagram of an example embodiment of a system 100 for efficient key sequencing. In the example of FIG. 1, the system 100 may include a search key sequencer 102 configured to generate, organize or otherwise sequence information from a packet 104 into a search sequence 106, whereby one or more searches 108 may be performed based on the search sequence 106.

The packet 104 may include a formatted block of data that may be communicated and/or transferred amongst one or more nodes of a network. The packet 104 may include control information, such as a header, and a payload or user data. The header may include values or information associated with a routing of the packet 104. For example, the header may include source address, destination address, virtual local area network (VLAN), priority, and/or other information. In an example embodiment, the other information may include virtual routing and forwarding (VRF) information that may be derived from information from the packet 104. In other example embodiments, at least a portion of the information about the routing of the packet 104 may be included in the payload in addition to and/or in lieu of being included in the header.

The search sequence 106 may include an arrangement, organization or sequence of information or values from the packet 104 to be used to perform one or more of the searches 108. As will be discussed further below, the search sequence 106 may be transferred or provided in portions over a limited bandwidth interface, whereby one or more searches 108 may be performed using a combination of one or more of the portions. The search key sequencer 102 may arrange the portions into the search sequence 106 to make efficient use of the limited bandwidth and/or time that may be available to perform one or more of the searches 108.

The searches 108 may include one or more searches, lookups, or other inquiries for information on how to process the packet 104. For example, the searches 108 may include forwarding (including destination and/or source), classification (including multi-tuple), filtering, access control list (ACL) and/or other searches. Each of the searches 108 may use at least a portion of the search sequence 106 when performing the searches 108.

The search sequence 106 may include a combination or sequencing of information from one or more fields 110A-G of the packet 104. The fields 110A, B, C, D, E, F and G may include information or values from the header and/or payload of the packet 104. As just referenced, the fields 110A-G may include information about the processing and/or routing of the packet 104. For example, the field 110A may include a source IP address (SIP) of the packet 104, the field 10B may include a destination IP address (DIP) of the packet 104, the field 110C may include virtual routing and forwarding (VRF) information about the packet 104 and the field 110D may include priority information about the packet 104.

In other example embodiments, the fields 110A-G may include additional and/or different information about the packet 104 which may vary depending on the protocol associated with the packet 104 and/or the searches 108 to be performed. Example embodiments may include Internet Protocol version 4 (IPv4), Internet Protocol version 6 (IPv6), as well as layer 2 and/or layer 3 searches 108. For example, in a layer 2 search 108, the field 110A may include a media access control source address (MACSA), the field 110B may include a media access control destination address (MACDA) and the field 110C may include a virtual local area network (VLAN) ID.

The fields 110A-G may each include or comprise one or more bits 112A, B and C. Each bit 112A-C may include a binary digit including the value of either 0 or 1. A sequence of one or more of the bits 112A-C may make up each of the fields 110A-C. In the example of FIG. 1, the field 110A is the only one shown with bits 112A-C, however one skilled in the art will appreciate that the packet 104 may include any number of fields 110A-G, and each field 110A-G may include any number of bits 112A-C, and the representation of FIG. 1 is exemplary. In other example embodiments, the fields 110A-G may be viewed as including a number of bytes, which in turn may each include one or more bits 112A-C.

In the example of FIG. 1, a packet handler 114 may receive the packet 104. The packet handler 114 may receive the packet 104 from a network. According to an example embodiment, the packet handler 114 may determine which protocol is associated with the packet 104. For example, the packet handler 114 may determine whether the packet 104 is associated with an IPv4, IPv6 and/or other type of protocol.

A parser 116 may be configured to parse the packet 104 into the fields 110A-G. For example, the parser 116 may parse the packet 104 based on the protocol associated with the packet 104 (as may be determined by the packet handler 114), whereby different protocols may be associated with one or more different fields 110A-G. Then for example, based on the protocol, the parser 116 may identify the fields 110A-G included in the packet 104. Or for example, the parser 116 may locate the various fields 110A-G within the packet 104 and/or determine which of the bits 112A-C are associated with which of the fields 110A-G, independent of the protocol or wherein each packet 104 includes the same or similar fields 110A-G.

A field selector 118 may be configured to select one or more of the fields 110A-G to be used to find information about the routing or processing of the packet 104. For example, the packet 104 may include more fields 110A-G than may be necessary for the system 100 to determine the how to route or process the packet 104. Then, for example, the field selector 118 may determine which of the fields 110A-G are to be used to perform each of the one or more searches 108 to determine the required or necessary routing and/or processing information.

An assembler 120 may be configured to arrange, assemble or otherwise sequence the fields 110A-G and/or the bits 112A-C included therewith, into the search sequence 106. As just referenced, the field selector 118 may select at least a portion of the fields 110A-G to be used to perform one or more of the searches 108, wherein each search 108 may be associated with one or more of the fields 110A-G. Then for example, the assembler 120 may assemble the search sequence 106 based on the fields 110A-G to be used in the searches 108 to be performed, accounting for any limited bandwidth and/or time that may be available to perform the searches 108 and/or provide the search sequence 106 (including portions thereof) to a routing table 122.

The routing table 122 may include a data structure including routing information 124 associated with routing and/or processing the packet 104. The routing table 122 may be associated with or implemented using a content-addressable memory (CAM); including a ternary CAM (TCAM); associative memory; associative storage; associative array; or other memory or data structure that may be used for searching. Then, for example, based on the search sequence 106 associated with the packet 104, the routing table 122 may include searchable routing information 124. According to an example embodiment, the search key sequencer 102 may provide a search key 126 (e.g., any of the search keys 126A-C) to the TCAM 122, and the TCAM 122 may search the routing information 124 for the provided search key 126 and return one or more storage addresses where the search key 126 was found. In example embodiments, the TCAM 122 may include a TCAM configured for parallel processing, where multiple searches 108 may be performed in parallel and may allow for searching to be performed prior to the end of a given time period or number of cycles. This may allow, for example, the TCAM 102 to allow for multiple searches 108 to be performed within a limited amount of time that may be available to process the packet 104.

The routing information 124 may include information associated with the routing and/or processing of the packet 104. For example, the routing information 124 may include information about which packets 104 are associated with which incoming ports of a network device, and based on the destination of the packet, which outgoing port of a network device the packet 104 is to be forwarded to. The routing information 124 may include information about how to process the packet, for example, a priority associated with the packet 104, where and/or whether the packet 104 should be routed or discarded and any other or additional processing that may be done on the packet 104.

The assembler 120 may assemble or generate the search sequence 106 by arranging, within the search sequence 106, the values or bits 112A-C from the packet 104 associated with each of one or more search keys 126A-C.

The search keys 126A-C may include sequences or arrangements of the bits 112A-C of the packet 104 used for the searches 108 and/or may correspond to one or more fields 110A-G of the packet 104. For example, as discussed above, each search 108 may be performed based on one or more of the fields 110A-G, including portions (e.g., bits 112A-C) thereof. Then, for example, the field(s) 110A-G corresponding to each search 108 may be included in one or more of the search keys 126A-C. For example, the search keys 126A, 126B and 126C may correspond to the fields 110A, 110C and 110F, respectively. In other example embodiments, each search key 126A-D may correspond to one or more of the fields 110A-G.

In the example of FIG. 1, the search sequence 106 may include the search keys 126A, 126B and 126C, and may itself be a search key. The search sequence 106 may include or overlap with those fields 110A-G already included in the search keys 126A-C. In other example embodiments, the search sequence 106 may include additional and/or different bits including, but not limited to, those bits 112A-C from other search keys 126A-C. Thus, in the example of FIG. 1, the assembler 120 may assemble the search sequence 106 such that the fields 110A-G associated with the search keys 126A-C only have to be sent once, rather than once for each search 108 associated with the search keys 126A-C and then again for the search 108 associated with the entire search sequence 106.

As will be discussed more below with reference to FIG. 2, the search keys 126A-C of the search sequence 106 may be organized and/or arranged within the search sequence 106 to leverage bit overlap between the fields (e.g., 110A-G) of the search keys 126A-C. This leveraging of bit overlap may allow for the maximization of bandwidth that may be available to the system 100 to transfer data (e.g., the search keys 126A-C) between the search key sequencer 102 and routing table 122. Constructing a compact search sequence 106 may avoid sending the same information (e.g., bits 112A-C and/or fields 110A-G) between the search key sequencer 102 and routing table 122, thereby preserving the limited amount of bandwidth and/or time that may be available to process the packet 104. In other systems that do not leverage bit overlap with a compact search sequence 106, the same information (e.g., bits 112A-C and/or fields 110A-G) may be transferred between the search key sequencer 102 and routing table 122 multiple times, thus consuming more bandwidth, which may result in either not having enough time to perform whatever searches 108 may be necessary for complete processing of the packet 104 and/or may result in a reduced number of searches possible into the routing database.

The routing information 124 may be organized within the routing table 122 with respect to the search sequence 106, including the arrangement or sequence of the search keys 126A-C included therein. For example, as referenced above, the routing table 122 may be implemented on a TCAM. The TCAM may receive a portion of the search sequence 106 over several periods of time associated with processing the packet 104. Each portion of the search sequence 106 may include at least a portion (e.g., bits 112A-C) associated with one or more of the search keys 126A-C. Then for example, when the routing table 122 (e.g., TCAM) receives one of the search keys 126A-C, across one or more of the portions of the search sequence 106, the routing table 122 can perform the search 108 associated with the received search key 126A-C. Then for example, using the TCAM capabilities, during the searches 108, the routing table 122 may ignore any bits 112A-C associated with searches 108 other than the one being performed. The functionality and/or arrangement of the routing table 122 with respect to the search sequence 106 is discussed in greater detail below with respect to FIG. 2.

As just referenced, a search engine 130 may provide one or more portions of the search sequence 106 to the routing table 122 over each of several periods of time associated with processing of the packet 104. For example, the search engine 130 may determine, based on an interface between the search key sequencer 102 and the routing table 122, how much bandwidth and/or how much time is available to transfer the search sequence 106 to the routing table 122 to perform the searches 108. Then, for example, this bandwidth and/or time constraints associated with the interface may be used by the assembler 120 to assemble the search keys 126A-C within search sequence 106 and by the search engine 130 to provide the search sequence 106, or portions thereof, to the routing table 122.

An execution engine 132 may be configured to receive the routing information 124, or portions thereof, as returned as results of one or more of the searches 108. The execution engine 132 may evaluate and/or process the received routing information 124 and process the packet 104 accordingly. For example, the execution engine 132 may determine which outgoing port the packet 104 should be forwarded to based on the result of the searches 108. Then, for example, the execution engine 132 may forward the packet 104 to the determined outgoing port or instruct another device to perform the forwarding.

The system 100 may arrange a plurality of bits 112A-C of any combination of fields 110A-G of a packet 104, into a search sequence 106, including one or more search keys 126A-C, where the search keys 126A-C may be used to determine routing information 124 about the packet 104 based on the performance of one or more searches 108. The system 100 may account for and/or arrange the search sequence 106, and associated routing table 122, based on a limited bandwidth interface that may exist or be associated with the routing table 122 so as to allow for an efficient transfer of the search keys 126A-C to the routing table 122 over one or more periods of time. The arrangement of the search keys 126A-C within the search sequence 106 may take advantage of field (e.g., 110) and/or bit (e.g., 112) overlap that may exist among the search keys 126A-C.

Figure 2:
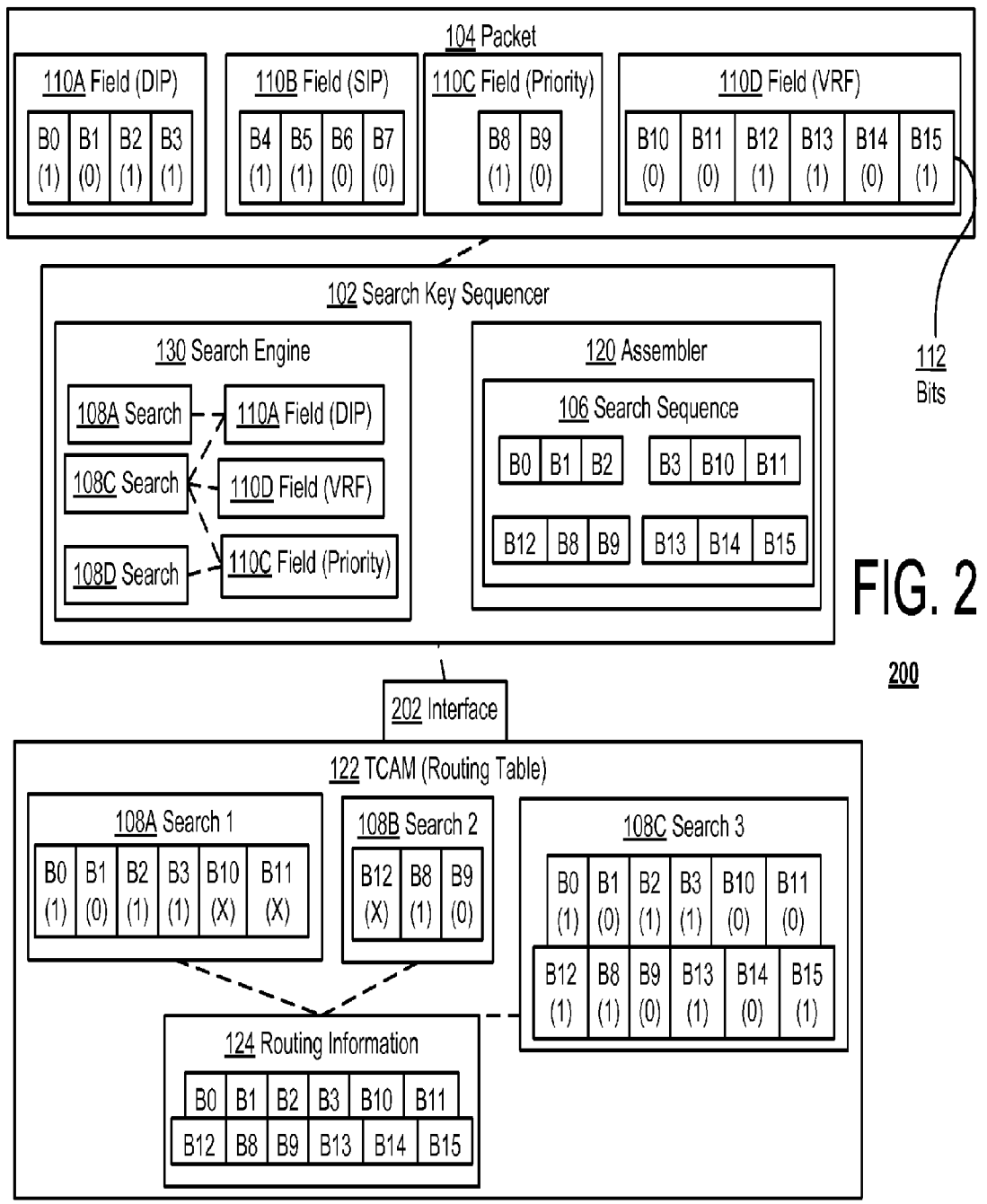
FIG. 2 is a block diagram of an example embodiment of a system for efficient key sequencing.

FIG. 2 is a block diagram of an example embodiment of a system 200 for efficient key sequencing. In the example of FIG. 2, the packet 104 may include four fields: field 110A destination IP address (DIP), field 110B source IP address (SIP), field 110C priority and field 110D virtual routing and forwarding (VRF). Then, for example, each field may include a certain number of bits 112. For example, field 110A may include 4 bits 112 (e.g., B0-B3) and field 110C may include 2 bits 112 (e.g., B8 and B9). In the example of FIG. 2, the VRF field 110D may not be an actual field included in the packet 104, but may be derived from one or more other fields (e.g., 110A-C) and/or bits 112 (e.g., B0-B15) of the packet 104.

The search engine 130 may determine that three searches are to be performed with regard to the packet 104, search 108A, search 108B and search 108C. Each of the searches 108A-C may be associated with one or more fields 110A-D, e.g., the associated fields 110A-D may be the search keys (120) for the related searches 108. For example, in FIG. 2, search 108A may use the search key of field 110A, search 108B may use the search key of field 110C and search 108C may use the search key of the combination of fields 110A, 110C and 110D. In the example of FIG. 2, it may be that none of the searches for the packet 104 use the fields 110B.

Then, for example, a field selector 118 (FIG. 1) may select the fields 110A, 110C and 110D as used in the searches 108A-C, and provide the fields to the assembler 120. The assembler 120 may then arrange the bits 112 of the fields 110A, 110C and 110D into the search sequence 106. As referenced above, the order in which the bits 112 are arranged within the search sequence 106 may be based on an interface 202 between the search key sequencer 102 and the routing table or TCAM 122.

The interface 202 may include any interface between the search key sequencer 102 and the TCAM 122. For example, the interface 202 may include pins, wires, or other electrodes connecting the search key sequencer 102 and the TCAM 122 and allowing for the transfer of information between them. In other example embodiments, the interface 202 may include a wireless interface. The interface 202 may include a limited bandwidth interface allowing for only the transfer of a limited number of bits 112 or information from the packet 104 at a time. For example, in FIG. 2, the TCAM 122 may only include 3 pins and then the interface 202 may only allow for the transfer of 3 bits 112 of information at a time.

Taking into account the limited bandwidth interface 202 that may exist between the search key sequencer 102 and the TCAM 122, the assembler 120 may organize the search sequence 106 to make efficient use of the bandwidth and time available to perform the searches 108A-C. For example, since only 3 bits 112 may be transferred to the TCAM 122 per cycle, in the first cycle the search sequence 106 may include the first 3 bits (B0-B2) of the field 110A. Then, in the second cycle, the search sequence 106 may include the final bit of the field 110A and two bits from the field 110D (e.g., bits 10 and 11). Then for example, after the second cycle, the TCAM 122 may perform the search 108A, wherein the two bits from the field 110D may be don't care (X) bits in the search. Similarly, the third cycle may include the two bits from the field 110C (B8 and B9) and B12 from the field 110D. Then, for example, after the third cycle the TCAM 122 may perform the search 108B. Then, for example, after the fourth cycle and the remaining bits of the field 110D are transferred, the TCAM 122 may perform the search 108C.

Knowing the sequence of the search sequence 106, the routing information 124 of the TCAM 122 may be organized to account for the order in which the bits 112 are expected to be received. The arrangement of the bits 112 within the TCAM 122, or other lookup database, may allow the compact search sequence 106 to achieve optimal results by taking advantage of overlap that may exist amongst the search keys of the searches 108A-C. For example, rather than being organized with bits 0-15 appearing in order, the routing information 124 may be organized with correspondence to the search sequence 106 as shown in FIG. 2. This may allow, for example, the TCAM 122 to perform searches 108A, 108B and 108C at the end of cycles 2, 3 and 4, respectively, without sending the information from fields 110A and 110C twice (e.g., once for the searches 108A and 108B and once for the search 108C), thus making the search sequence 106 efficient given the limited bandwidth interface 202 that may exist. In other example embodiments, the order in which the searches 108A-C are to be performed may be of greater importance and may be accounted for in the arrangement of the search sequence 106 and/or the routing information 124.

Figure 3:
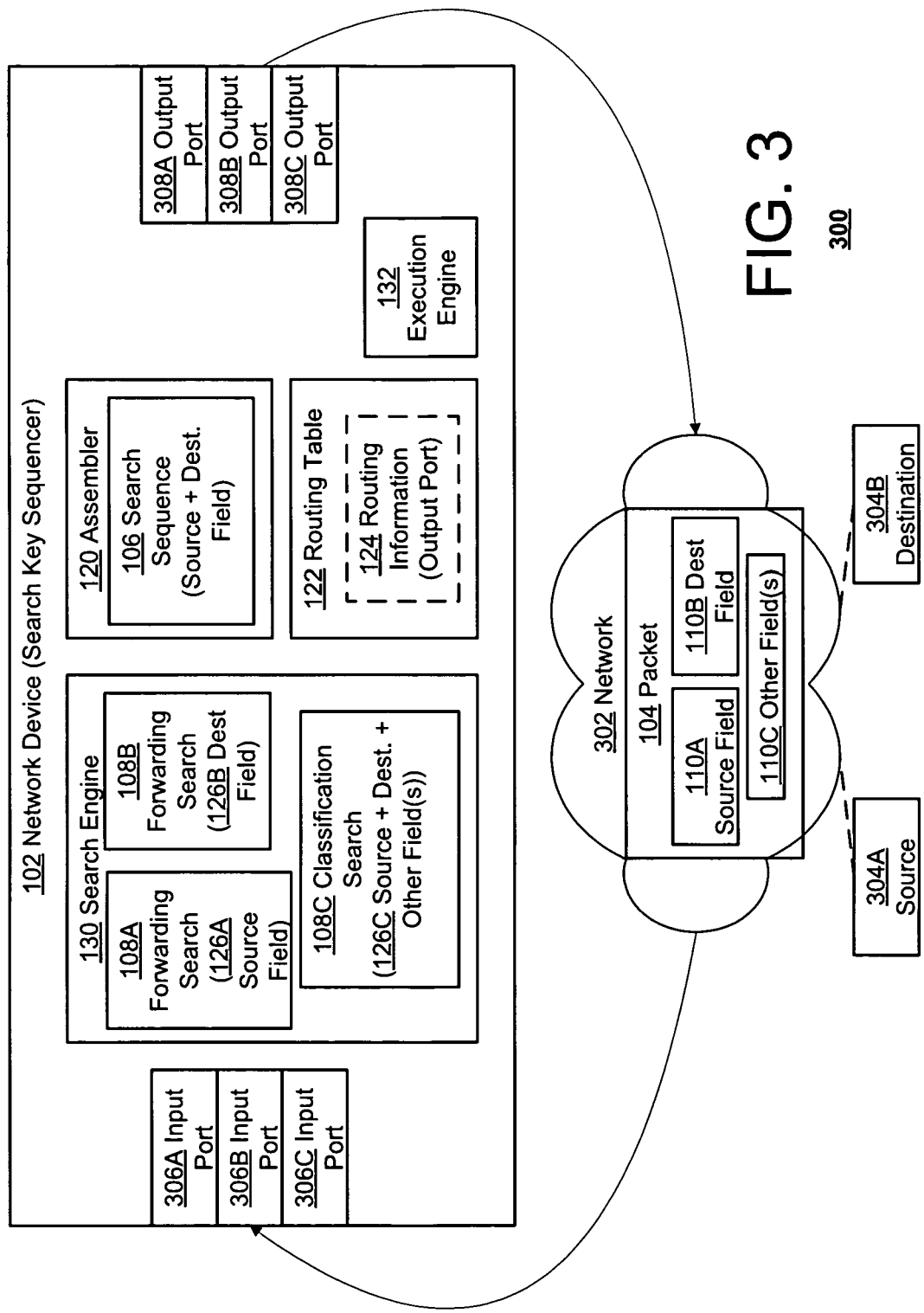
FIG. 3 is a block diagram of an example embodiment of a system for efficient key sequencing.

FIG. 3 is a block diagram of an example embodiment of a system 300 for efficient key sequencing. In the example of FIG. 3, the packet 104 may be received from a network 302 or a source device 304 on the network 302.

The network 302 may include a computer network, telecommunications network and/or other network connecting two or more nodes of the network 302. For example, the network 302 may include the Internet, an intranet, a local area network (LAN), a wide area network (WAN), a wired network, a wireless network and/or any other kind of network configured to carry and/or transmit the packet 104 between a first node and a second node on the network 302.

The source device 304A and the destination device 304B may each include a node on the network 302. For example, the source 304A may transmit the packet 104 to the destination 304B via the network 302. Then, for example, as part of the transmission via the network 302, the packet 104 may be transmitted to the network device 102 (search key sequencer).

The network device 102 may include any network device configured to process and/or otherwise route one or more packets 104 on the network 302 or amongst a plurality of networks 302. The network device 102 may include, for example, a router or network bridge. Then, for example, the network device 102 may receive the packet 104 on any one of a plurality of incoming ports 306A, 306B or 306C.

The incoming ports 306A-C may include any interface through or upon which the network device 102 may receive the packet 104. The ports 306A-C may include, for example, a physical interface between the network device 102 and the network 302 (including one or more nodes 304A, B thereon) or a virtual data connection between programs. According to an example embodiment, the ports 306A-C may be associated with a specific Internet or other network protocol. The output ports 308A, 308B and 308C may be similar to those incoming ports 306A-C, except rather than being used to receive the packet 104 from the network 302, the output ports 308A-C may be used to provide the packet 104 back to the network 302 and/or a node (e.g., destination 304B) thereon. In other example embodiments, there may be a varying number of input ports 306A-C and/or output ports 308A-C.

In the example of FIG. 3, the search engine 130 may perform a forwarding search 108A using the source field 110A as a search key 126A, a forwarding search 108B using the destination field 110B as a search key 126B, and a classification search 108C using a combination of the source field 110A, the destination field 110B and one or more other fields 110C such as packet priority or VLAN as a search key 126C. In other example embodiments, one or more other searches 108, including filtering and/or access control list (ACL) searches, may be performed. Then, for example, the assembler 120 may organize the search sequence 106 based on the searches 108A-C to be performed, to determine the routing information 124 from the routing table 122. From the routing information 124 yielded from the searches 108A-C, the execution engine 132 may determine a classification associated with the packet 104 (e.g., how to process and/or handle the packet 104) and the output port 308A-C to which the packet 104 is to be forwarded to reach the destination 304B via the network 302. Then for example, the execution engine 132 may process the packet 104 accordingly.

Figure 4:
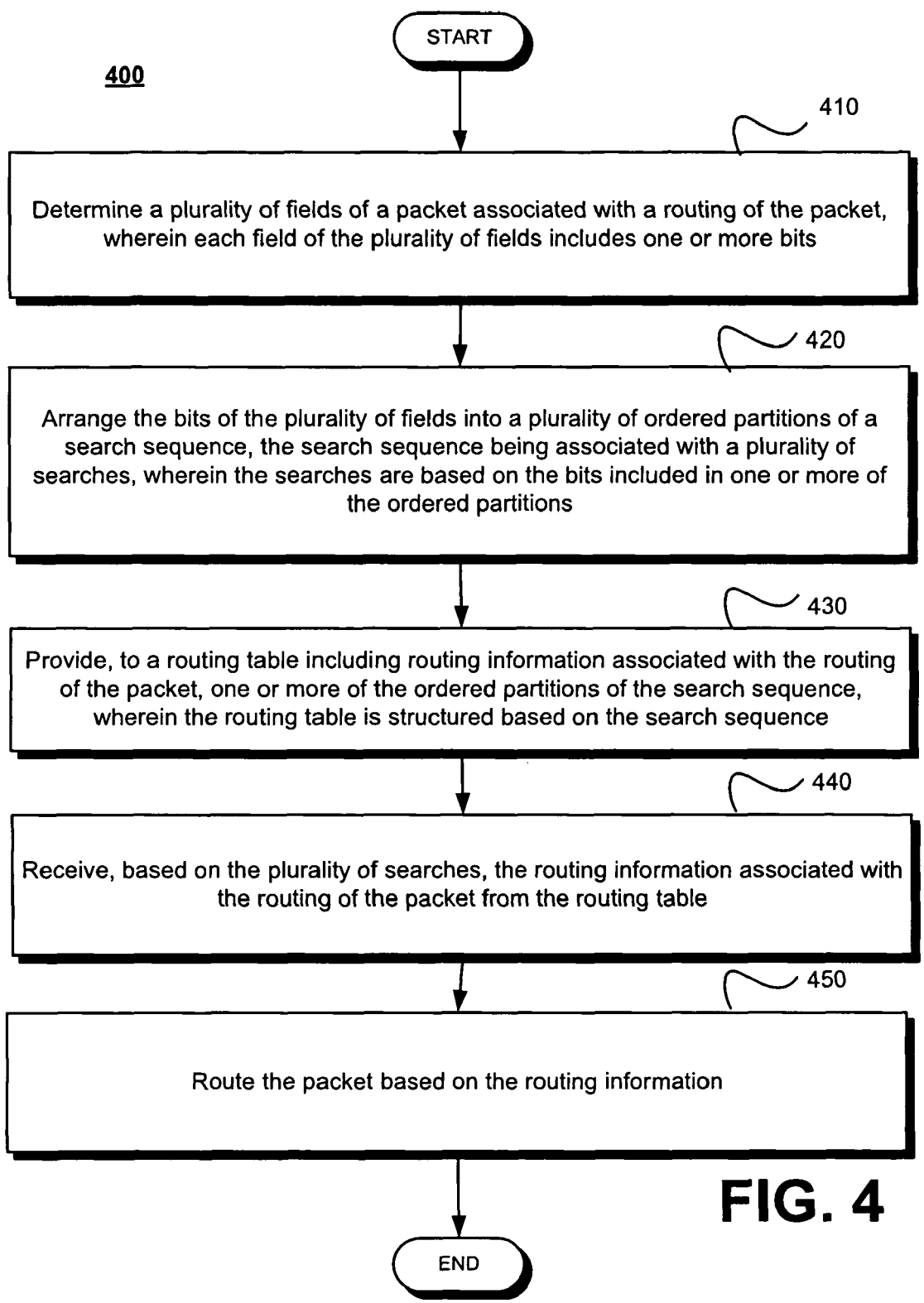
FIG. 4 is a flowchart illustrating example operations of the systems of FIGS. 1-3.

FIG. 4 is a flowchart 400 illustrating example operations of the systems of FIGS. 1-3. More specifically, FIG. 4 illustrates an operational flow 400 representing example operations related to efficient key sequencing. While FIG. 4 illustrates an example operational flow 400 representing example operations related to the systems 100, 200 and 300 of FIGS. 1, 2 and 3, respectively, it should be appreciated that the operational flow 400 is not limited to these examples and may be applied to other systems.

After a start operation, at block 410, a plurality of fields of a packet associated with routing of the packet may be determined, wherein each field of the plurality of fields includes one or more bits. For example, in FIG. 1, the parser 116 may parse the packet 104 for the fields 110A-G, wherein each field 110A-G includes one or more bits 112A-C.

At block 420, the bits of the plurality of fields may be arranged into a plurality of ordered partitions of a search sequence, the search sequence being associated with a plurality of searches, wherein the searches are based on the bits included in one or more of the ordered partitions. For example, in FIG. 2, the assembler 120 may arrange the bits 112 of the fields 110A, 110C and 110D into the 3-bit partitions of the search sequence 106 based on the searches 108A-C.

At block 430, routing information associated with the routing of the packet may be provided to a routing table, including the one or more of the ordered partitions of the search sequence, wherein the routing table is structured based on the search sequence. For example, in FIG. 2, the ordered partitions of the search sequence 106 may be provided to the TCAM (routing table) 122 where the routing information 124 of the routing table 122 is structured based on the search sequence 106.

At block 440, the routing information associated with the routing of the packet from the routing table may be received based on the plurality of searches. For example, in FIG. 3, the execution engine 132 may receive the routing information 124 from the routing table 122 based on the searches 108A-C.

At block 450, the packet may be routed based on the routing information. For example, in FIG. 3, the execution engine 132 may route the packet 104 to the appropriate output port 308A-C based on the routing information 124.

Figure 5:
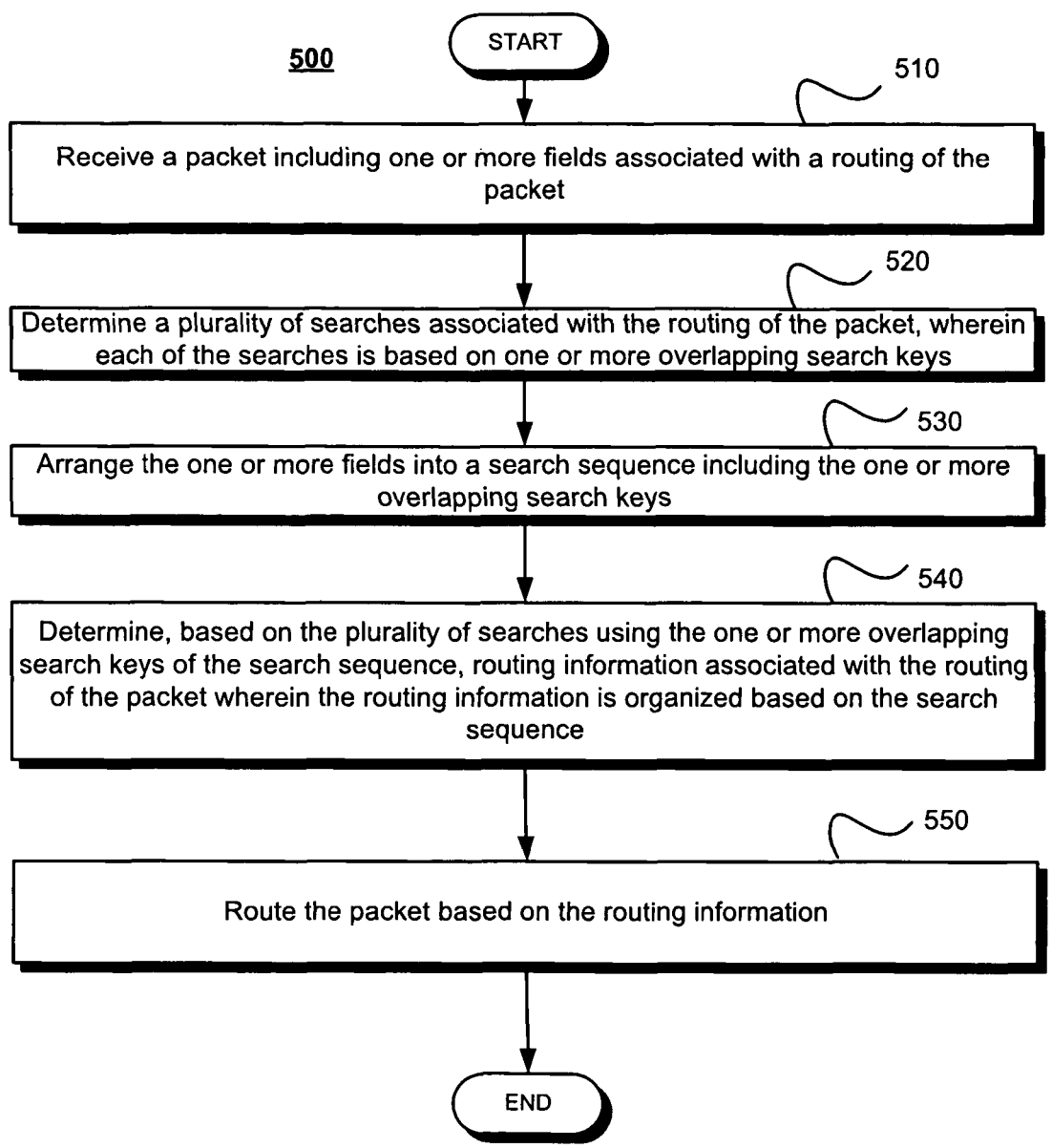
FIG. 5 is a flowchart illustrating example operations of the systems of FIGS. 1-3.

FIG. 5 is a flowchart 500 illustrating example operations of the systems of FIGS. 1-3. For instance, FIG. 5 illustrates an operational flow 500 representing example operations related to efficient key sequencing. While FIG. 5 illustrates an example operational flow 500 representing example operations related to the systems 100, 200 and 300 of FIGS. 1, 2 and 3, respectively, it should be appreciated that the operational flow 500 is not limited to these examples and may be applied to other systems.

After a start operation, at block 510, a packet including one or more fields associated with a routing of the packet may be received. For example, in FIG. 1, the packet 104, including the fields 110A-G associated with a routing of the packet 104, may be received.

At block 520, a plurality of searches associated with the routing of the packet may be determined, wherein each of the searches is based on one or more overlapping search keys. For example, in FIG. 1, a plurality of the searches 108 may be determined, wherein each of the searches is based on one or more of the overlapping search keys 126A-D.

At block 530, the one or more fields may be arranged into a search sequence including the one or more overlapping search keys. For example, in FIG. 1, the assembler 120 may arrange the one or more fields 110A-G into the search sequence 106 including the one or more overlapping search keys 126A-D.

At block 540, based on the plurality of searches using the one or more overlapping search keys of the search sequence, routing information associated with the routing of the packet may be determined, wherein the routing information is organized based on the search sequence. For example, in FIG. 1 and FIG. 2, the routing information 124 associated with the routing of the packet 104 may be determined based on a performance of the searches 108 using the one or more overlapping search keys 126A-D, wherein the routing information 124 is organized based on the search sequence 106.

At block 550, the packet may be routed based on the routing information. For example, in FIG. 2, the execution engine 132 may route the packet 104 based on the routing information 124.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:
   determining a plurality of fields of a packet associated with a routing of the packet, wherein each field of the plurality of fields includes one or more bits;
   arranging the bits of the plurality of fields into a plurality of ordered partitions of a search sequence, the search sequence being associated with a plurality of searches, wherein the searches are based on the bits included in one or more of the ordered partitions;
   providing, to a routing table including routing information associated with the routing of the packet, the ordered partitions of the search sequence over a plurality of time periods, wherein one or more of the ordered partitions are provided during each of the plurality of time periods and the routing table is structured based on the search sequence;
   receiving, based on the plurality of searches, the routing information associated with the routing of the packet from the routing table; and
   routing the packet based on the routing information.

2. The method of claim 1, wherein the determining comprises receiving the packet from a network.

3. The method of claim 1, wherein the determining comprises parsing the packet into the plurality of fields.

4. The method of claim 1, wherein the arranging comprises:
   determining which of the plurality of searches are based on one or more overlapping search keys, wherein each of the search keys are associated with one or more of the fields; and
   arranging the bits of the one or more fields associated with the search keys into the search sequence based on the overlapping search keys.

5. The method of claim 1, wherein the arranging comprises:
   determining a bandwidth associated with the routing table, wherein the bandwidth restricts how many of the ordered partitions are provided to the routing table in a given time period of the plurality of time periods; and
   arranging the bits of the plurality of fields into the plurality of ordered partitions of the search sequence based on the bandwidth.

6. The method of claim 5, wherein the arranging comprises arranging the bits of the plurality of fields into the plurality of ordered partitions of the search sequence based on the bandwidth, wherein one or more of the plurality of searches are performed within the given time period.

7. The method of claim 1, wherein the arranging comprises:
   determining an order of the searches to be performed, wherein one or more of the searches are based on one or more overlapping search keys;
   sequencing the search keys based on the order, wherein the search keys are associated with one or more of the fields; and
   arranging the bits of the plurality of fields into the plurality of ordered partitions of the search sequence based on the sequencing.

8. The method of claim 1, wherein the providing comprises providing one or more of the ordered partitions, over each of a plurality of time periods associated with processing the packet, to the routing table.

9. The method of claim 1, wherein the providing comprises providing the search sequence to the routing table, wherein the routing information is searchable based on the ordered partitions of the search sequence.

10. The method of claim 9, wherein the receiving comprises determining the routing information based on a first search of the plurality searches using one or more of the ordered partitions associated with the first search.

11. The method of claim 1, wherein the routing comprises determining how to route the packet based on the routing information.

12. A network device including:
electronic circuitry; and
a non-transitory machine readable storage device which stores at least one of firmware and machine readable instructions, wherein the at least one of the firmware and the machine readable instructions, when executed by the electronic circuitry, provide for implementing:
- a packet handler configured to receive a packet associated with a network;
- a parser configured to parse the packet into a plurality of fields, the plurality of fields being associated with a routing of the packet on the network;
- a field selector configured to select one or more fields from the plurality of fields based on one or more searches associated with the routing of the packet;
- an assembler configured to arrange the one or more selected fields into a plurality of ordered partitions of a search sequence, the search sequence including one or more search keys associated with each of the one or more searches;
- a search engine configured to provide each of the search keys to a routing table that includes routing information associated with the routing of the packet over a plurality of time periods, wherein one or more of the ordered partitions are provided during each of the plurality of time periods; and
- an execution engine configured to receive the routing information based on the one or more searches and route the packet on the network based on the routing information.

13. The network device of claim 12, wherein the assembler is configured to:
- parse the one or more selected fields into a plurality of bits; and
- arrange the plurality of bits into the search sequence, including the search keys.

14. The network device of claim 12, wherein the search engine is configured to transmit one or more of the search keys to a content addressable memory (CAM) associated with the routing table during a first time period of the plurality of time periods.

15. The network device of claim 12, further comprising a ternary content addressable memory (TCAM) associated with the routing table, the TCAM being configured to perform two or more of the searches in parallel based on the search keys of the search sequence.

16. The network device of claim 15 wherein the TCAM is configured to provide routing information to the execution engine responsive to a performance of one or more of the searches.

* * * * *